(12) United States Patent
Suzuki et al.

(10) Patent No.: US 8,546,990 B2
(45) Date of Patent: *Oct. 1, 2013

(54) PERMANENT MAGNET SYNCHRONOUS ROTATING ELECTRIC MACHINE AND ROTOR CORE

(75) Inventors: Takeo Suzuki, Fukuoka (JP); Akihiko Maemura, Fukuoka (JP); Yosuke Kawazoe, Fukuoka (JP); Yuto Fukuma, Fukuoka (JP); Takeshi Inoue, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,522

(22) Filed: Jun. 19, 2012

(65) Prior Publication Data
US 2012/0256508 A1 Oct. 11, 2012

Related U.S. Application Data

(63) Continuation of application No. 13/183,437, filed on Jul. 15, 2011, now Pat. No. 8,227,953, which is a continuation of application No. 11/960,773, filed on Dec. 20, 2007, now Pat. No. 8,008,825.

(30) Foreign Application Priority Data

Mar. 20, 2007 (JP) ................. 2007-072140

(51) Int. Cl.
*H02K 1/27* (2006.01)
(52) U.S. Cl.
USPC ................................. 310/156.53

(58) Field of Classification Search
USPC .................. 310/156.53, 156.58
See application file for complete search history.

(56) References Cited

U.S. PATENT DOCUMENTS 3,840,763 A 10/1974 Baumann et al.
5,159,220 A 10/1992 Kliman
(Continued)

FOREIGN PATENT DOCUMENTS

JP 08-256441 10/1996
JP 2000-102202 4/2000
(Continued)

OTHER PUBLICATIONS

Ohmori et al., "Control of Permanent Magnet Synchronous Motor", Toyo Denki Technical Report No. 111, Mar. 2005, pp. 13-21.
(Continued)

*Primary Examiner* — Burton Mullins
*Assistant Examiner* — Eric Johnson
(74) *Attorney, Agent, or Firm* — Ditthavong Mori & Steiner, P.C.

(57) ABSTRACT

A permanent magnet synchronous rotating electric machine includes a rotor and a stator. The rotor includes a first hole, a second hole, a first magnet, and a second magnet. The second hole is provided on an opposite side with respect to a center line extending along a radial direction of the rotor. The first magnet is provided in the first hole and extends along a first longitudinal axis inclined at a first acute angle with respect to the center line. The second magnet is provided in the second hole and extends along a second longitudinal axis inclined at a second acute angle with respect to the center line. The second acute angle is smaller than the first acute angle.

25 Claims, 9 Drawing Sheets

(56) References Cited

U.S. PATENT DOCUMENTS

| | | |
|---|---|---|
| 6,225,724 B1 | 5/2001 | Toide et al. |
| 6,340,857 B2 | 1/2002 | Nishiyama et al. |
| 6,844,652 B1 | 1/2005 | Chu et al. |
| 7,151,335 B2 * | 12/2006 | Tajima et al. ............ 310/156.48 |
| 7,425,786 B2 | 9/2008 | Hino et al. |
| 2005/0140236 A1 | 6/2005 | Jeong et al. |
| 2006/0113858 A1 | 6/2006 | Hino et al. |
| 2007/0096579 A1 | 5/2007 | Aydin et al. |
| 2007/0145850 A1 | 6/2007 | Hsu |
| 2007/0284960 A1 | 12/2007 | Fulton et al. |
| 2008/0007131 A1 | 1/2008 | Cai et al. |

FOREIGN PATENT DOCUMENTS

| | | |
|---|---|---|
| JP | 2002-112513 | 4/2002 |
| JP | 2004-254466 | 9/2004 |
| JP | 2004-328956 | 11/2004 |
| JP | 2005-39963 | 2/2005 |
| JP | 2005-57958 | 3/2005 |
| JP | 2005-130604 | 5/2005 |
| JP | 2005-160133 | 6/2005 |
| JP | 2005-184957 | 7/2005 |
| JP | 2005-312102 | 11/2005 |
| JP | 2006-50821 | 2/2006 |
| JP | 2006-109683 | 4/2006 |
| JP | 2006-187189 | 7/2006 |
| JP | 2006-211826 | 8/2006 |
| JP | 2006-223052 | 8/2006 |
| JP | 2006-254629 | 9/2006 |
| JP | 2007-068357 | 3/2007 |
| WO | WO 2006/095887 | 9/2006 |

OTHER PUBLICATIONS

Korean Office Action for corresponding KR Application No. 10-2008-0025524, Feb. 22, 2010.

Chinese Office Action for corresponding CN Application No. 200810085588.X, Jul. 13, 2010.

Taiwanese Office Action for corresponding TW Application No. 096145150, Feb. 26, 2013.

* cited by examiner

BACKGROUND ART

BACKGROUND ART

BACKGROUND ART

PERMANENT MAGNET SYNCHRONOUS ROTATING ELECTRIC MACHINE AND ROTOR CORE

CROSS-REFERENCE TO RELATED APPLICATIONS

The present application is a continuation application of the U.S. patent application Ser. No. 13/183,437, filed Jul. 15, 2011, which is a continuation application of the U.S. patent application Ser. No. 11/960,773, filed Dec. 20, 2007, which claims priority to Japanese Patent Application No. 2007-072140 filed Mar. 20, 2007. The contents of these applications are incorporated herein by reference in their entirety.

BACKGROUND OF THE INVENTION

1. Field of the Invention

The present invention relates to a permanent magnet synchronous rotating electric machine and a rotor core.

2. Discussion of the Background

Recently, from viewpoints of prevention of global warming and resource conservation, duties to be performed by a vehicle such as a hybrid car, and an industrial power saving machine are becoming very important. In order to perform the duties, it is necessary to reduce $CO_2$-discharge, and improve the amount of energy consumption and efficiency.

For such the vehicle such as the hybrid car or the industrial power saving machine, a permanent magnet type synchronous rotating electric machine is required, which has characteristics that high output and high-speed rotation are possible, reliability is high and efficiency is good, rotation speed is variable, and controllability is good. As a rotating electric machine satisfying this condition, there is a synchronous motor in which a permanent magnet is included in a rotor, that is, an interior permanent magnet (IPM) motor. Since this motor providing size reduction and weight reduction are realized, the range of its use in the field of the industrial power saving machine is increasing. For example, the motor is applied also to a crane, a winding machine, an elevator, an elevator of a multi-level parking zone, a compressor or a blower for wind or water power, a fluid machine such as a pump, and a processing machine including mainly a semiconductor manufacturing member or a machine tool. In the present embodiment, IPM motor will be mainly described FIG. 6 is a front view of an electromagnetic steel plate forming member blanked to mold a rotor core in a first related art.

In FIG. 6, an electromagnetic steel plate forming member 35 is composed of a thin disc-shaped electromagnetic steel plate for forming a rotor core. In this electromagnetic steel plate forming member 35, a magnetic hole 31 for inserting therein a permanent magnet is provided per pole when the rotor is formed. An outer bridge 32 is formed between this magnet hole 31 and a circumferential surface of the rotor. When the plural electromagnetic steel plate forming member 35 are laminated in the block shape, an electromagnetic steel plate laminator (rotor core 34 in FIG. 7) is manufactured (refer to, for example, JP-A-2006-211826, Specification P.4, and FIGS. 1 to 3 and Toyo Denki Technical Report No. 111, 2005-3, P.13 to P.21).

Next, the operational principle of the interior permanent magnet motor will be described.

FIG. 7 is a front sectional view of a main part of an interior permanent magnet motor to which the rotor in the first related art is applied. In the shown motor, the number of magnetic poles of permanent magnets of the rotor is six poles, and the number of magnetic poles of salient poles of a stator (the same number as the number of slots) is 36 pieces.

In FIG. 7, regarding the operation of the motor, in the rotor 30 in which a permanent magnet 33 is inserted into the interior of a rotor core 34, the gap flux density becomes high in a q-axis constituting a magnetic convex portion which is small in magnetic resistance, and the gap flux density becomes low in a d-axis constituting a magnetic concave portion which is large in magnetic resistance. By such the saliency of the rotor 30, the following relation is produced: Lq>Ld, when Lq is q-axis inductance and Ld is d-axis inductance. Therefore, reluctance torque produced by change in flux density in addition to magnet torque may be used, so that more increase in efficiency may be expected. The magnet torque generates by a magnetic attraction force and a magnetic repulsion force between a magnetic field by the permanent magnet 33 of the rotor 30 and a rotating magnetic field by a stator winding housed (not-shown) in a slot 42 in a stator core 41 of the stator 40. The reluctance torque generates by attraction of the salient pole portion of the rotor 30 to the rotating magnetic field by the stator winding (not shown).

Next, a second related art will be described with reference to FIG. 8.

FIG. 8 is a front view of an electromagnetic steel plate forming member blanked to mold a rotor core in the second related art (refer to, for example, JP-A-2005-039963, Specification P.4 to P.6, and FIGS. 1 and 2, JP-A-2005-057958, Specification P.4 to P.7, and FIGS. 1 and 5, JP-A-2005-130604, Specification P.8, and FIG. 1, JP-A-2005-160133, Specification P.8, and FIG. 1, JP-A-2002-112513, Specification P.5, and FIGS. 1 and 3, and JP-A-2006-254629, Specification P.7 and P.8, and FIG. 4.)

In FIG. 8, an electromagnetic steel plate forming member 50 is composed of a thin disc-shaped electromagnetic steel plate for forming a rotor core. In this electromagnetic steel plate forming member 50, two magnet holes 52 and 53 are provided in the V-shape so that two magnets per pole are inserted on the rotor outer diameter side symmetrically with respect to radial pole pitch lines provided at a predetermined pole pitch angle, when a rotor is formed. An outer bridge 54 is formed between the outer end portion of the magnet holes 52, 53 and a circumferential surface of the rotor. Further, in the electromagnetic steel plate forming member 50, a center bridge 51 is provided between the magnet holes 52 and 53. When the plural electromagnetic steel plate forming member 50 are laminated in the block shape, an electromagnetic steel plate laminator (rotor core 57 in FIG. 9) is manufactured.

Next, the operation will be described with reference to FIG. 9.

FIG. 9 is a front sectional view of a main part of an IPM motor to which the rotor in the second related art is applied, which shows schematically a positional relation of poles between a stator and a rotor which generate optimum rotating torque. FIG. 10A and 10B are diagrams for explaining of the operation of the IPM motor in the second related art. FIG. 10A is a schematic diagram showing the operation when the motor rotates normally, and FIG. 10B is a diagram showing a relation between a current phase which generates a rotating magnetic field of the motor and torques. The number of magnetic poles of permanent magnets of the rotor in the shown motor is eight poles, and the number of magnetic poles of salient poles of a stator (the same number as the number of slots) is 48 pieces.

In FIGS. 9 and 10A, the IPM motor has a permanent magnet type rotor 50 in which permanent magnets 55, 56 having the same size as the size of magnet holes 52, 53 are inserted into the magnet holes. In such the constitution, a magnetic field by the permanent magnets 55, 56 embedded in the interior of a rotor core 57 and a rotating magnetic field by a stator winding housed (not-shown) in a slot 62 in a stator core 61 of a stator 60 attract and repel each other, thereby to generate a magnet torque. Further, since the magnetic resistance in the direction of a q-axis orthogonal to the direction of a d-axis which is a magnet axis becomes smaller than that in the d-axis direction, saliency structure is provided. Therefore, a q-axis inductance Lq becomes larger than a d-axis inductance Ld, and reluctance torque generates by this saliency. In FIGS. 9 and 10A, the permanent magnets 55, 56 which are embedded in the magnet holes 52, 53 and arranged in the V-shape are isosceles. Therefore, a repulsion-boundary point of magnetic fluxes by the permanent magnets in an outer iron core portion sandwiched between the two permanent magnets having the same size which are opposed to each other in the same poles is located in the center of the outer iron core portion of the rotor 50, and on a center line OC passing through a center of the radial pole pitch lines OP.

In FIGS. 9 and 10A, though a force for giving rotary energy to the rotor 50 is actually composed by strength of current flowing in the stator winding (not shown) in the slot 62 and the like, its description is simplified here. Flux density distribution of the motor will be described, paying attention to a pole located at 12 o'clock.

The d-axis repulsion-boundary point of the outer iron core portion surrounded by the two permanent magnets 55, 56 of the same polarity is located in the center of the surface of the rotor 50. In case that the poles formed by the stator windings (not shown) in the slots 62 are shown as in FIGS. 9 and 10A, on the gap surface between the stator 60 and the rotor 50, the left side with respect to the repulsion-boundary point on the line OC becomes an attraction part constructed so that the stator is the N-pole and the rotor is the S-pole, and the right side with respect to the repulsion-boundary point on the line OC becomes a repulsion part constructed so that both of the stator and the rotor become the S-pole. On the surface of the rotor 50, the attraction part becomes dense in magnetic flux and the repulsion part becomes sparse in magnetic flux. Therefore, magnet torque which is about to move the rotor 50 from the side in which the magnetic flux is dense to the side in which the magnetic flux is sparse, that is, in the clockwise direction acts on the rotor 50. Further, the q-axis flux flows mainly in teeth 63 of the stator 60 opposed to the salient poles.

In the description related to FIG. 10A, since attraction is produced between the magnetic fields by the permanent magnets 55, 56 of the rotor 50 and the rotating magnetic fields by the stator windings (not shown) in the slots 62 and the d-axis salient pole portion of the rotor 50 is attracted to the rotating magnetic field by the stator winding (not shown), the flux density in the oblique line portion becomes particularly high. At this time, with respect to the S-pole component of the permanent magnets and the S-pole component by the stator windings (not shown), the N-pole component by the windings is short. Therefore, the reluctance torque which is about to move the rotor 50 in a direction where the magnetic flux of the S-pole component is shortened, that is, in the clockwise direction acts on the rotor 50.

Here, as shown in FIG. 10B, the magnet torque which is produced by the magnetic attraction force and the magnetic repulsion force between the magnetic field by the magnet and the rotating magnetic field by the winding shows a relation of a curve in the figure, and the reluctance torque generated by the attraction of the salient pole portion of the rotor to the rotating magnetic field by the winding shows a relation of a curve in the figure. Hereby, by putting the magnet torque and the reluctance torque together, a torque shown by a thick solid line in the figure may be generated.

However, in the second related art, in the outer iron core portion formed between the upper surface of the two permanent magnet insertion holes and the outer diameter of the rotor core, the q-axis flux by armature reaction is easy to be saturated. Therefore, the reluctance torque may not be utilized, so that it is difficult to obtain large torque in the starting time or in abrupt change in load.

Further, as shown in the second related art, in the shape in which the two permanent magnets are arranged in the V-shape per pole, magnetic anisotropy is stronger than that in the shape having flat arrangement of the permanent magnets as shown in the first related art. However, the anisotropy is not sufficiently used, and this shape in the second related art does not attribute to improvement of motor efficiency in the low-speed operation time and in the light-load operation time.

SUMMARY OF THE INVENTION

According to one aspect of the present invention, a permanent magnet synchronous rotating electric machine includes a rotor and a stator. The rotor includes a first hole, a second hole, a first magnet, and a second magnet. The second hole is provided on an opposite side with respect to a center line extending along a radial direction of the rotor. The first magnet is provided in the first hole and extending along a first longitudinal axis inclined at a first acute angle with respect to the center line. The second magnet is provided in the second hole and extending along a second longitudinal axis inclined at a second acute angle with respect to the center line. The second acute angle is smaller than the first acute angle and is formed opposite to the first acute angle with respect to the center line. An outer circumferential distance between a first radially outer end of the first magnet and a second radially outer end of the second magnet is greater than an inner circumferential distance between a first radially inner end of the first magnet and a second radially inner end of the second magnet. The stator includes a stator core and a stator winding provided to the stator core. The stator has a displacement point of magnetism to be generated by a current passing through the stator winding of the stator. The displacement point is provided on an inner peripheral surface facing an outer peripheral surface of the rotor via a gap. The magnetism of the rotor on the outer peripheral surface is different from the magnetism of the stator on the inner peripheral surface on a first side of the center line when the displacement point is provided substantially on the center line of the rotor. The magnetism of the rotor on the outer peripheral surface is same as the magnetism of the stator on the inner peripheral surface on a second side of the center line when the displacement point is provided substantially on the center line of the rotor. The second side is provided on an opposite side of the first side with respect to the center line in the circumferential direction.

According to another aspect of the present invention, a permanent magnet synchronous rotating electric machine includes a rotor and a stator. The rotor includes a first hole, a second hole, a first magnet, and a second magnet. The second hole is provided on an opposite side with respect to a center line extending along a radial direction of the rotor. The first magnet is provided in the first hole and extending along a first longitudinal axis inclined at a first acute angle with respect to the center line. The second magnet is provided in the second hole and extending along a second longitudinal axis inclined at a second acute angle with respect to the center line. The second acute angle is smaller than the first acute angle and is formed opposite to the first acute angle with respect to the center line. An outer circumferential distance between a first radially outer end of the first magnet and a second radially outer end of the second magnet is greater than an inner circumferential distance between a first radially inner end of the first magnet and a second radially inner end of the second magnet. The stator includes a stator core and a stator winding. The stator core has a plurality of teeth. The stator winding is provided to the teeth. The stator has a displacement point of magnetism to be generated by a current passing through the stator winding of the stator. The second displacement point is provided on an inner peripheral surface facing an outer peripheral surface of the rotor via a gap. A d-axis is defined as a magnetic axis of a magnetic convex portion of the rotor. A q-axis is defined as a salient pole of a magnetic concave portion of the stator. Substantially two of the teeth of the stator core are opposed to the salient pole in which magnetic flux along the q-axis flows when the displacement point is provided substantially on the center line of the rotor.

According to further aspect of the present invention, a rotor core includes an electromagnetic steel plate layered body, a first hole, a second hole, a first magnet, and a second magnet. The electromagnetic steel plate layered body includes a first hole and a second hole. The second hole is provided on an opposite side with respect to a center line extending along a radial direction of the rotor. The first magnet is provided in the first hole and extending along a first longitudinal axis inclined at a first acute angle with respect to the center line. The second magnet is provided in the second hole and extending along a second longitudinal axis inclined at a second acute angle with respect to the center line. The second acute angle is formed opposite to the first acute angle with respect to the center line. An outer circumferential distance between a first radially outer end of the first magnet and a second radially outer end of the second magnet is greater than an inner circumferential distance between a first radially inner end of the first magnet and a second radially inner end of the second magnet. The second acute angle is smaller than the first acute angle so that saturation of flux along q-axis is suppressed and reluctance torque is produced.

DESCRIPTION OF THE EMBODIMENTS

Figure 1:
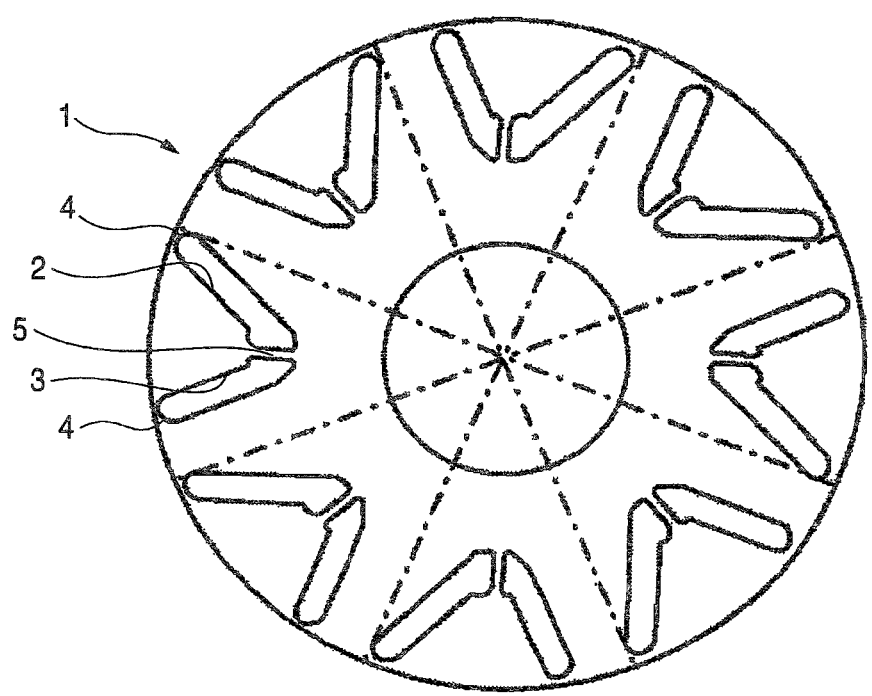
FIG. 1 is a front view of an electromagnetic steel plate forming member blanked in order to form a rotor core, which shows an embodiment of the invention.

According to a first aspect of the embodiment, a thin disc-shaped electromagnetic steel plate forming member for forming a rotor core including permanent magnets therein, wherein first and second magnet holes for inserting therein two magnets per pole are formed, in a range of radial pole pitch lines provided for the thin disc-shaped electromagnetic steel plate forming member at a predetermined pole pitch angle, along a V-shape having a rotation center side as a vertex, the first and second magnet holes are partitioned by a center bridge located at a vertex portion of the V-shape, and one of the first and the second magnet holes is displaced in a direction apart from a center line of pole pitch lines, and the other is displaced in a direction approaching to the center line of the pole pitch lines.

According to a second aspect of the embodiment, the thin disc-shaped electromagnetic steel plate forming member, wherein the first and the second magnet holes have an asymmetrical shape.

According to a third aspect of the embodiment, the thin disc-shaped electromagnetic steel plate forming member, wherein a length in a radius direction of one of the first and the second magnet holes is longer than a length in the radius direction of the other.

According to a fourth aspect of the embodiment, the thin disc-shaped electromagnetic steel plate forming member, wherein the first and the second magnet holes are positioned so that a distance of an iron core portion from an outer end surface of each hole to a circumferential surface of the thin disc-shaped electromagnetic steel plate forming member is substantially the same.

According to a fifth aspect of the embodiment, the thin disc-shaped electromagnetic steel plate forming member, wherein arcuate spaces for preventing flux leakage are provided, for both end portions in a radius direction of each of the first and the second magnet holes, in a bulging shape toward an outer circumferential side.

According to a sixth aspect of the embodiment, the thin disc-shaped electromagnetic steel plate forming member, wherein arcuate spaces for preventing flux leakage are provided, for both end portions in a radius direction of each of the first and the second magnet holes, in a bulging shape toward an inner circumferential side.

According to a seventh aspect of the embodiment, the thin disc-shaped electromagnetic steel plate forming member, wherein each of the first and the second magnet holes includes an arcuate space for preventing flux leakage which bulges outward at a larger curvature than a curvature of a corner portion of the magnet hole so as to include a corner portion.

According to an eighth aspect of the embodiment, the thin disc-shaped electromagnetic steel plate forming member, wherein the first and the second magnet holes have a substantial rectangular.

According to a ninth aspect of the embodiment, the thin disc-shaped electromagnetic steel plate forming member, wherein the first and the second magnet holes have an arcuate.

According to a tenth aspect of the embodiment, the thin disc-shaped electromagnetic steel plate forming member, wherein a cavity portion is provided in an area of the thin disc-shaped electromagnetic steel plate forming member which is determined by stress limit by centrifugal force and is located on the radial pole pitch line.

According to an eleventh aspect of the embodiment, an electromagnetic steel sheet laminator constituted in a block shape by laminating the plural thin disc-shaped electromagnetic steel plate forming member.

According to a twelfth aspect of the embodiment, A permanent magnet type synchronous rotating electric machine rotor provides a rotor core constituted by the thin disc-shaped electromagnetic steel sheet laminator, and a first and a second permanent magnets which are inserted into a first magnet hole and a second magnet hole inside the rotor core to generate fields.

According to a thirteenth aspect of the embodiment, the permanent magnet type synchronous rotating electric machine rotor, wherein in an iron core portion formed between the outer end surfaces of the first and the second magnetic holes and a circumferential surface of the rotor core, magnetic fluxes formed by the first and the second permanent magnets are distributed with displacement in the circumferential direction from a center of radial pole pitch lines provided in the rotor core at a predetermined pole pitch angle.

According to a fourteenth aspect of the embodiment, the permanent magnet type synchronous rotating electric machine rotor, wherein the rotor is a rotor of an 8-pole interior permanent magnet rotating electric machine.

According to a fifteenth aspect of the embodiment, a permanent magnet type synchronous rotating electric machine provides, and a stator arranged around the rotor.

According to a sixteenth aspect of the embodiment, the permanent magnet type synchronous rotating electric machine, wherein the number P of magnetic poles of permanent magnets arranged in magnet holes of the rotor and the number M of salient magnetic poles arranged in salient poles of the stator satisfies P=2(n+1) (n is an integer which is one or more) and M=6P.

According to a seventeenth aspect of the embodiment, the permanent magnet type synchronous rotating electric machine wherein the rotating electric machine is an interior permanent magnet rotating electric machine in which the number of magnetic poles of the permanent magnets is 8 poles.

According to an eighteenth aspect of the embodiment, a vehicle provides the permanent magnet type synchronous rotating electric machine used as a drive motor for driving wheels.

According to a nineteenth aspect of the embodiment, a vehicle provides the permanent magnet type synchronous rotating electric machine used as a generator.

According to a twentieth aspect of the embodiment, an elevator provides the permanent magnet type synchronous rotating electric machine used as a drive motor.

According to a twenty-first aspect of the embodiment, a fluid machine provides the permanent magnet type synchronous rotating electric machine as a drive motor.

According to a twenty-second aspect of the embodiment, a processing machine provides the permanent magnet type synchronous rotating electric machine used as a drive motor.

According to the embodiment, in the range of the radial pole pitch lines provided in the rotor core at the predetermined pole pitch angle, one of the two magnet holes for inserting therein the two permanent magnets per pole along the V-shape is displaced in the direction apart from the center line of the pole pitch lines, and the other is displaced in the direction approaching to the center line of the pole pitch lines. Hereby, the magnetic fluxes formed by the two permanent magnets are distributed with displacement in the circumferential direction from the center of the pole pitch lines in the rotor core. Therefore, in the iron core portion formed between the upper end surfaces of the two magnet holes arranged in the V-shape and the outer circumferential portion of the rotor core, saturation of the q-axis flux may be suppressed, and both utilization of the reluctance torque and improvement of the magnet torque can be realized. As the result, the permanent magnet type synchronous electric machine rotor and the permanent magnet type synchronous electric machine can be realized, which may obtain large torque also in the starting time and in abrupt change of load, are good in efficiency, and are used in a field such as a vehicle, an elevator, a fluid machine, a processing machine and the like.

(Embodiment 1)

Figure 2:
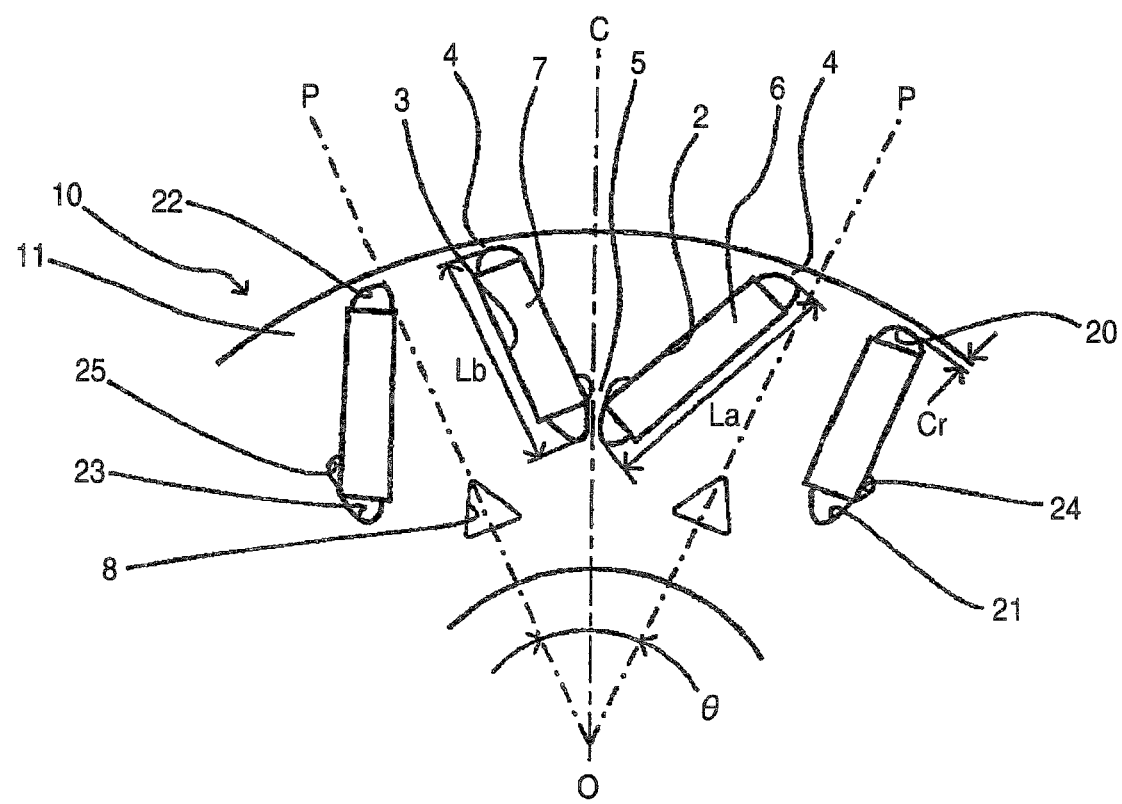
FIG. 2 is an enlarged front sectional view of a rotor to which the electromagnetic steel plate forming member is applied, which shows a structure of the rotor.

FIG. 1 is a front view of an electromagnetic steel plate forming member blanked in order to form a rotor core, which shows an embodiment of the invention, and FIG. 2 is an enlarged front sectional view of a rotor to which the electromagnetic steel plate forming member is applied, which shows a structure of the rotor.

In FIG. 1, reference numeral 1 is an electromagnetic steel plate forming member, 2 and 3 are first and second magnet holes, and 4 is an outer bridge. Further, in FIG. 2, reference numeral 5 is a center bridge, 6 and 7 are first and second permanent magnets, 8 is a cavity portion, 10 is a rotor, 11 is a rotor core, and 20, 21, 22, 23, 24, and 25 are arcuate spaces for preventing flux leakage. Reference character 0 is a center of rotation, OP is a pole pitch line, OC is a center line of the pole pitch lines, θ is a pole pitch angle, La and Lb are respectively lengths in a radius direction of the first and second magnet holes 2 and 3, and Cr is a distance of an iron core portion between the upper end surface of the magnet hole 2, 3 and a circumferential surface of the rotor core 11.

In FIG. 1, the electromagnetic steel plate forming member 1 is a thin disc-shaped electromagnetic steel plate for forming a rotor core. In a region of radial pole pitch lines provided in this disc-shaped electromagnetic steel plate forming member 1 at a predetermined pole pitch angle, two magnet holes for inserting therein two magnets per pole are provided in the shape of V-shape having the rotation center side of the core as a vertex. The outer bridge 4 is located at a portion between the outer end portion of the magnet hole 2, 3 of this electromagnetic steel plate forming member 1 and the outer circumferential portion of the rotor. Further, the center bridge 5 which partitions the magnet holes is provided in the electromagnetic steel plate forming member 1 so as to be located at the vertex portion of the V-shaped magnet holes 2, 3. When the plural electromagnetic steel plate forming member 1 are laminated in the block shape, an electromagnetic steel plate laminator (rotor core 11 in FIG. 1) is manufactured.

Next, in FIG. 2, characteristics of the first and second magnet holes 2, 3 for inserting therein the two permanent magnets 6, 7 per pole in the rotor core 11 formed of the electromagnetic steel plate forming member 1 shown in FIG. 1 will be described in detail. In the region of the radial pole pitch lines OP provided along the V-shape having the rotation center side of the core 11 as a vertex at the predetermined pole pitch angle θ, the first magnet hole 2 is displaced in the direction apart from the center line OC passing through a center of the two pole pitch lines OP, and the second magnet hole 3 is displaced in the direction approaching to the center line OC passing through a center of the two pole pitch lines OP.

These first and second magnet holes 2, 3 are arranged asymmetrically, and the length La in the radius direction of the first magnet hole 2 is longer than the length Lb in the radius direction of the second magnet hole 3.

Further, the first and second magnet holes 2, 3 are provided in the rotor core 11 in such positions that the distance Cr of the iron core portion from the outer end surface of each hole for inserting therein the magnet 6, 7 to the outer circumferential portion of the rotor core 11 is uniform.

Further, in the first and second magnet holes 2 , 3, at both end portions in the radius direction of the respective magnet holes, the arcuate spaces 20, 21, 22, and 23 for preventing flux leakage are provided in the bulging shape toward the outer circumferential side or the inner circumferential side.

Further, the arcuate spaces 24 and 25 are provided shape which is bulging outward at a curvature larger than a curvature of the corner portion so as to include a corner portion of each of in the first and second magnet holes 2, 3 respectively. The first and second magnet holes 2, 3 described in this embodiment may be formed in the substantially rectangular shape or alternatively arcuate.

Further, the cavity portion 8 is provided in an area determined by stress limit by centrifugal force and located on the radial pole pitch line OP in the rotor core 11 formed of the electromagnetic steel plate forming member 1.

Next, an IPM motor to which the rotor according to the embodiment is applied will be described.

Figure 3:
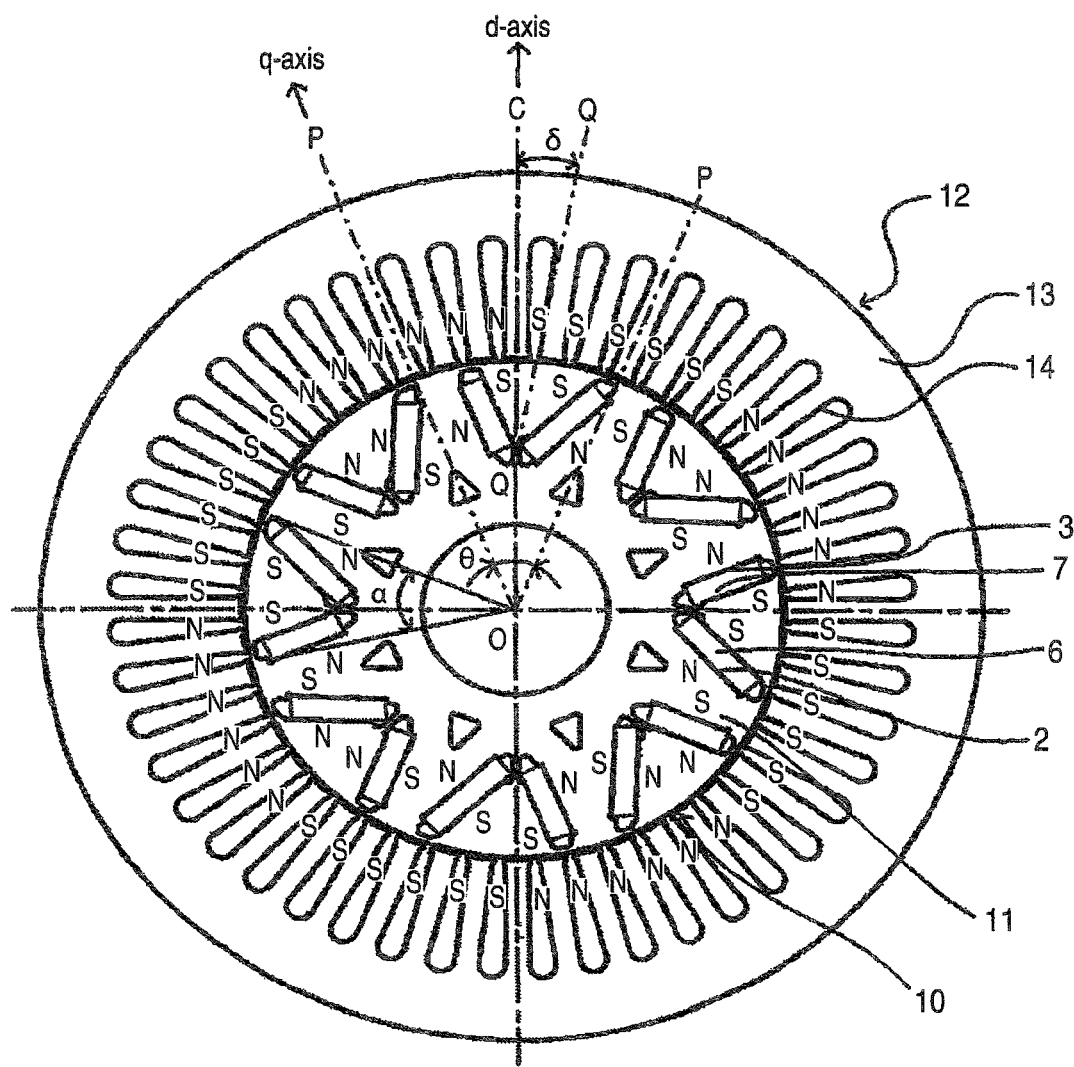
FIG. 3 is a front sectional view of a main part of an IPM motor to which the rotor is applied, which represents schematically a positional relation of magnetic poles between a stator and the rotor which generate an optimum rotation torque.

FIG. 3 is a front sectional view of a main part of an IPM motor to which the rotor according to the embodiment is applied, which represents schematically a positional relation of magnetic poles between a stator and a rotor which generate an optimum rotation torque. The number of magnetic poles of permanent magnets of the rotor in FIG. 3 is eight poles, and the number of magnetic poles of salient poles of the stator (it is equal to the number of slots) is 48 pieces. Combination of the magnet number and the slot number is the same as that in the second related art.

In the IPM motor, permanent magnets 6, 7 embedded in a rotor 10 are arranged in the V-shape, and the same poles thereof face to each other. Though their thicknesses in the circumferential direction are the same, a length in the diameter direction of one permanent magnet 6 is longer than the other permanent magnet 7. Further, distance Cr of an iron core portion between the outer end surface of each permanent magnet and the outer circumferential portion of the rotor 10 is provided with the same depth. Further, an open angle of the permanent magnets 6, 7 shown in FIG. 3 with respect to a rotation center of the rotor 10 is set to the same angle as the open angle of the permanent magnets 55, 56 shown in FIG. 10 in the second related art. Accordingly, a repulsion-boundary point of magnetic fluxes by the permanent magnets in the outer iron core portion sandwiched between the two permanent magnets 6 and 7 having the same poles and the different length is located on the side of the permanent magnet 7 which is short in length in the radius direction, that is, in a position δ-displacement in the circumferential direction from a center line Q-Q passing through a center of an opening angle (open angle) α of the permanent magnets 6, 7 arranged in the modified V-shape (on a center line OC of pole pitch lines of the rotor 10).

FIG. 3 shows the example in which the number of magnetic poles of the permanent magnets arranged in the magnet holes of the rotor is 8 poles, and the number of salient magnetic poles arranged in salient poles (number of slots) of stator is 48 pieces. Preferably, this combination is represented by the following relation.

P=2 (n+1) (n is an integer which is one or more), and M=6P, wherein P is the number of magnetic poles of the permanent magnets in the rotor, and M is the number of magnetic poles of the salient poles of the stator.

By the combination thereof, a rotating electric machine which reduces cogging and vibration, and operates at high output and with high efficiency may be obtained.

Next, an operation of normal rotation of rotating electric machine will be described.

Figure 4A:
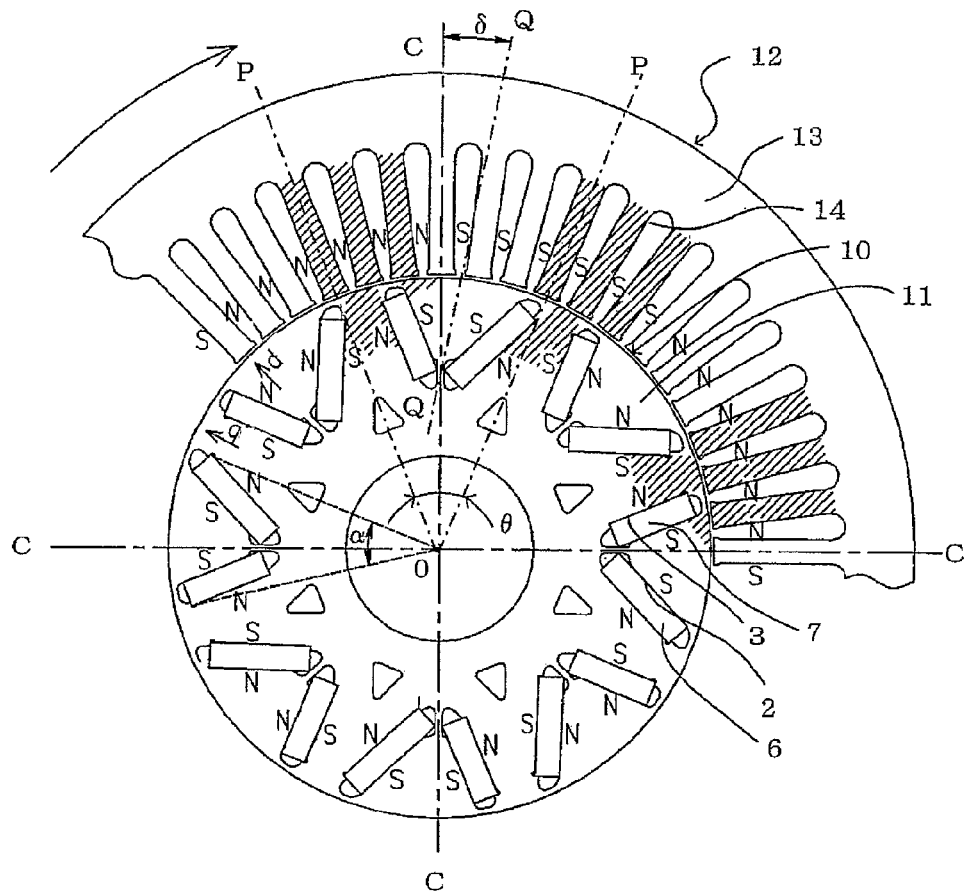
FIG. 4A is a diagram for explaining the operation of the IPM motor, which is a schematic diagram showing the operation when the motor rotates normally.
Figure 4B:
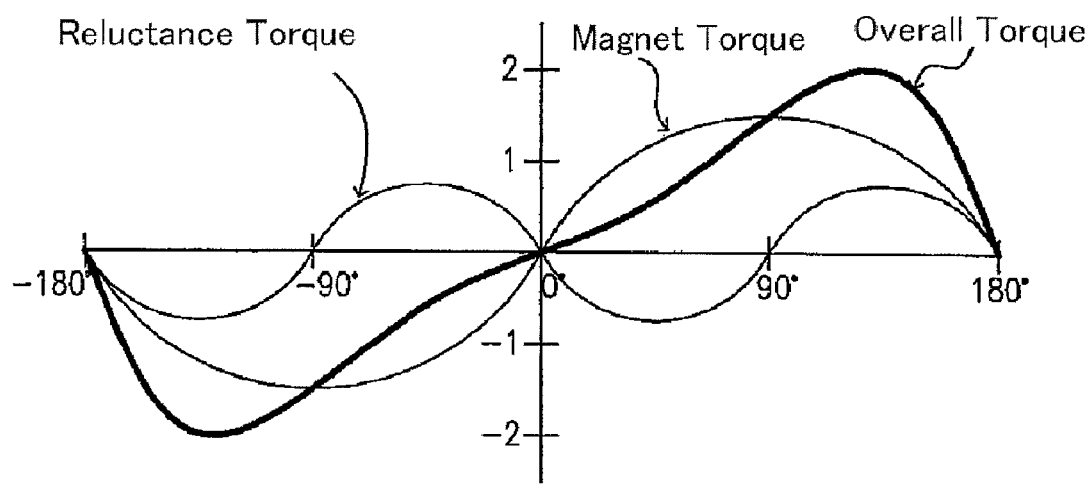
FIG. 4B is a diagram for explaining the operation of the IPM motor, which is a diagram showing a relation between a current phase which generates a rotating magnetic field of the motor and torque.

FIGS. 4A and 4B are diagrams for explaining the operation of the IPM motor, which FIG. 4A is a schematic diagram showing the operation when the motor rotates normally, and FIG. 4B is a diagram showing a relation between a current phase which generates a rotating magnetic field of the motor and torque.

In FIG. 4A, a magnetic repulsion-boundary point of a d-axis in an outer iron core portion surrounded by the two same-pole permanent magnets 6, 7 which are different from each other in length is on the surface of the rotor 10 located on the outside of the bottom portion of the V-arrangement. In the following description, the amount of displacement on its surface is taken as a declination (δ) which is the amount of displacement from the center line OC of the pole pitch lines OP by about one slot of the stator as shown in FIG. 3.

In case that poles formed by stator windings (not shown) attached in the slots 14 of the stator core 13 are as shown in FIG. 4A, on a gap surface between the stator and the rotor, the left side of the magnetic repulsion-boundary point (existing on the line OC) becomes an attractive portion in which the stator winding side is the N-pole and the permanent magnet side is the S-pole, and the right side thereof becomes a repulsive portion in which both the stator winding side and the permanent magnet side are the S-poles. Though the attractive portion becomes dense in magnetic flux and the repulsive portion becomes sparse in magnetic flux, since the attractive portion is smaller in the number of the N-poles on the stator side generated by the current direction of the stator windings is smaller than that in the related art example shown in FIG. 10, the attractive portion is higher in flux density than that in the example shown in FIG. 10. Further, since the repulsive portion is larger in the number of the S-poles on the stator side than that in the example shown in FIG. 10, the repulsive portion is lower in flux density than that in the example shown in FIG. 10. Since its difference of density is large, magnet torque which works on the rotor so as to move the rotor from the dense flux side to the sparse flux side becomes larger than that in the example shown in FIG. 10. Further, in FIG. 4A, though the open angle α of the two permanent magnets 6, 7 with respect to the rotation center of the rotor is the same as that in the example shown in FIG. 10, since the magnetic repulsion-boundary point in the d-axis is displaced by about one slot (δ in FIGS. 3 and 4), the number of the magnetic poles of the salient poles (teeth) of the stator opposed to the salient pole of the rotor in which the q-axis flux flows becomes substantially two, while it is one in the example in FIG. 10. Therefore, magnetic saturation is difficult to occur. In the description related to FIG. 3, since attraction occurs between the magnetic fields by the permanent magnets of the rotor and the rotating magnetic fields by the windings, and the d-axis salient pole portion of the rotor is attracted to the rotating magnetic fields by the windings, the flux density in the portion shown by oblique lines in FIG. 4A becomes particularly high. At this time, the N-pole component becomes further shorter with respect to the S-pole component of the permanent magnets and the S-pole component of the windings by one slot than that in the example of FIG. 10, so that reluctance torque which is about to move the rotor in the direction where the magnetic flux of the S-pole component is shortened, that is, in the clockwise direction works more strongly than that in the example of FIG. 10.

Next, a relation between current phase and torque of the permanent magnet type synchronous rotating electric machine will be described.

As shown in FIG. 4A, in the iron core portion formed between the outer end surfaces of the first and second magnet holes 2, 3 and the outer circumferential portion of the rotor core 11, the magnetic fluxes formed by the first and second permanent magnets 6, 7 are distributed with displacement from the center line OC of the radial pole pitch lines OP provided in the rotor core 11 at the predetermined pole pitch angle in the circumferential direction of the rotor core 11. Accordingly, by displacing the d-axis flux, magnetic resistance of the d-axis becomes large, and the q-axis inductance Lq becomes increasingly larger than the d-axis inductance Ld. Therefore, since saliency becomes remarkable, reluctance torque is easy to generate. Simultaneously, in order to suppress the q-axis flux saturation, the permanent magnet arrangement is displaced so that the number of the magnetic poles of the salient poles (teeth) of the stator opposed to the q-axis in the pole pitch lines OP is increased. Hereby, the saturation of the q-axis flux maybe mitigated. FIG. 4B shows a curve in a relation of the magnet torque generated by the magnetic attraction and the magnetic repulsion between the magnetic fields by the magnets and the rotating magnetic fields by the windings, and the reluctance torque generated by the attraction of the salient pole portion of the rotor to the rotating magnetic field by the winding. Therefore, an overall torque shown by a thick solid line in FIG. 4B may be generated by putting the magnet torque and the reluctance torque together.

Next, an operation of reverse rotation of rotating electric machine will be described.

Figure 5A:
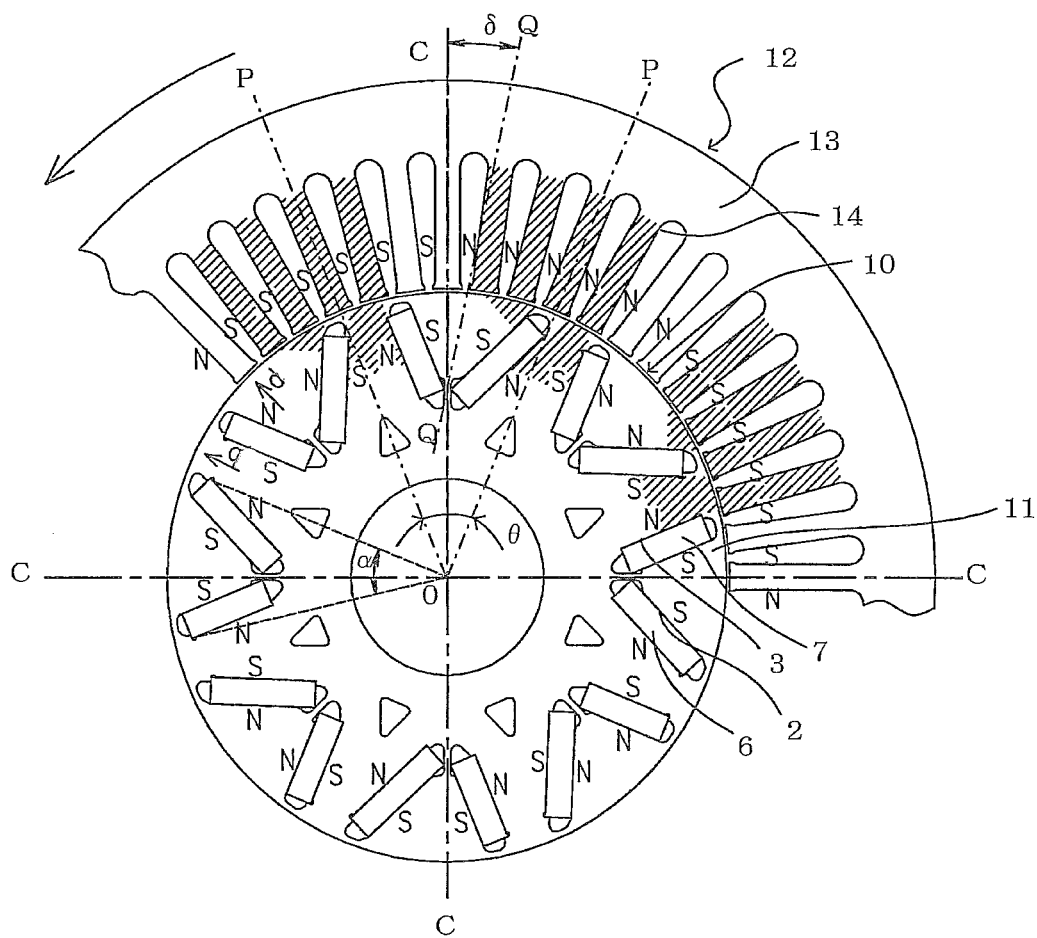
FIG. 5A is a diagram for explaining the operation of the IPM motor, which is a schematic diagram showing the operation when the motor rotates reversely.
Figure 5B:
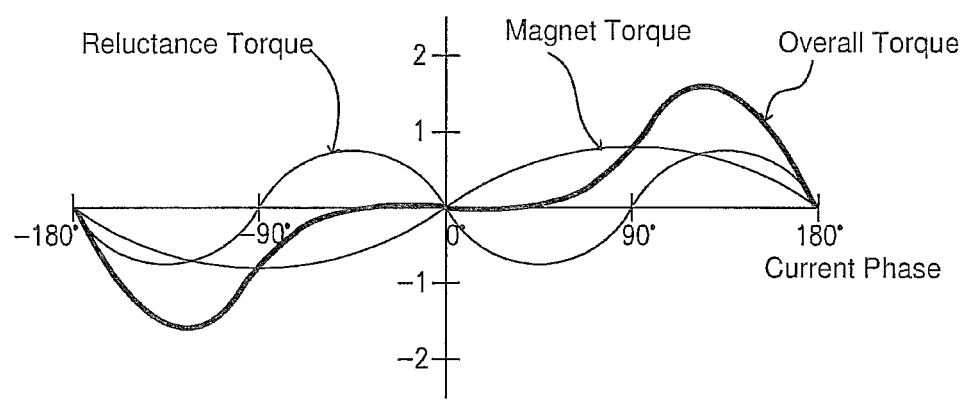
FIG. 5B is a diagram for explaining the operation of the IPM motor, which is a diagram showing a relation between a current phase which generates a rotating magnetic field of the motor and torque.
Figure 6:
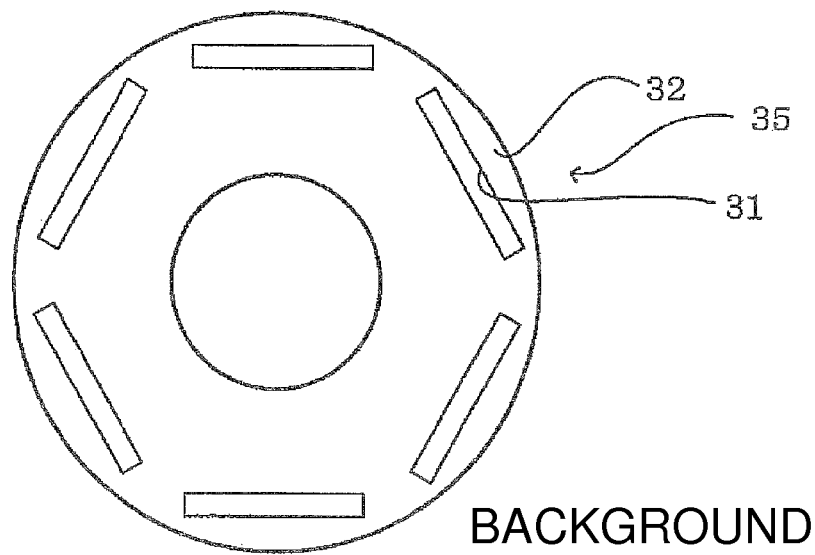
FIG. 6 is a front view of an electromagnetic steel plate forming member blanked in order to mold a rotor core in a first related art.
Figure 7:
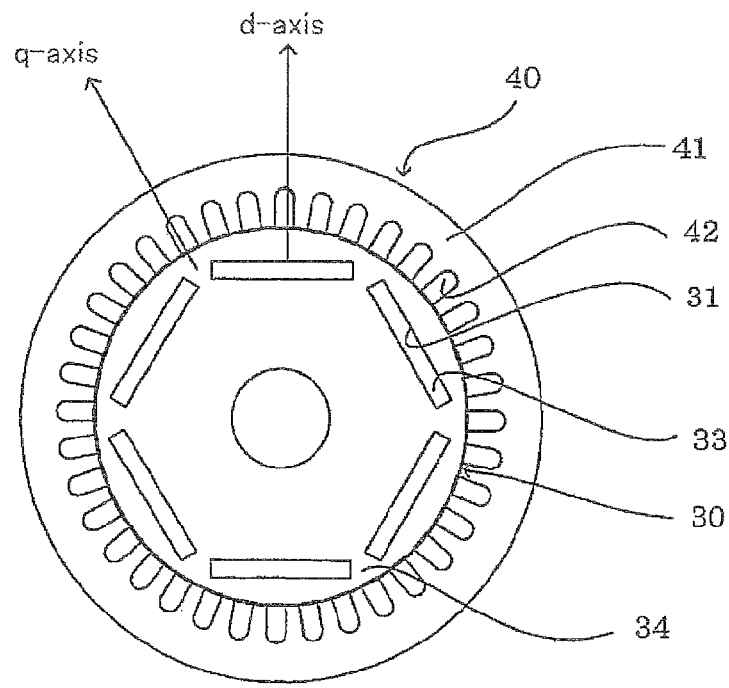
FIG. 7 is a front sectional view of a part of an IPM motor to which the rotor in the first related art is applied.
Figure 8:
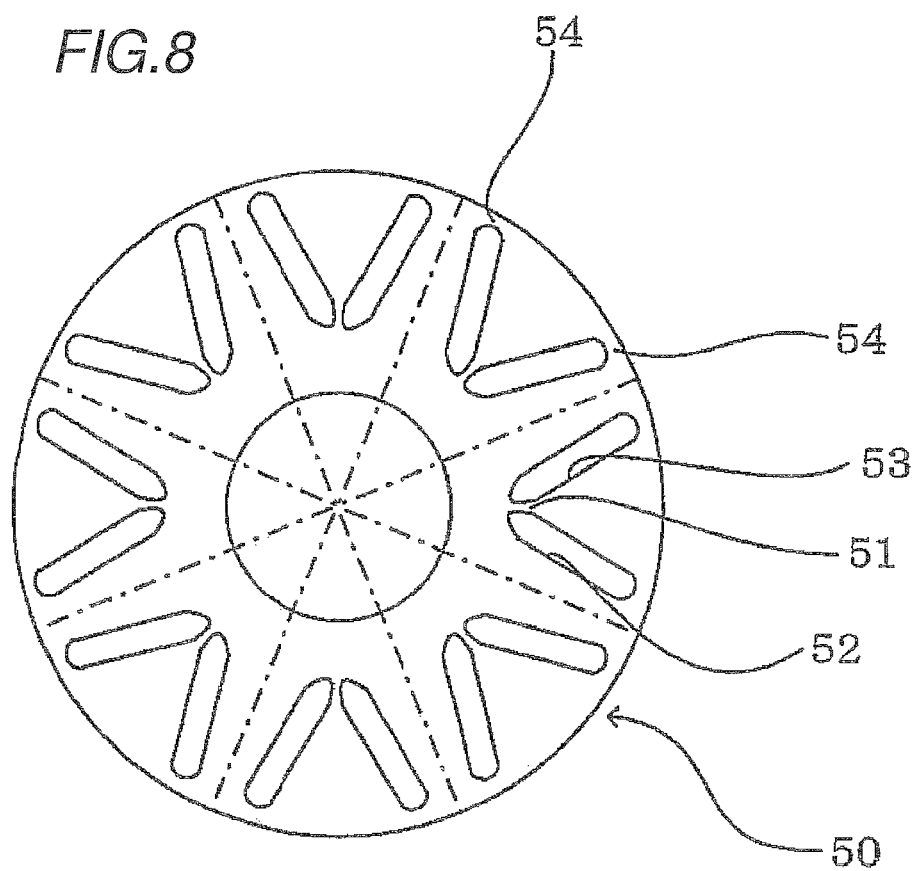
FIG. 8 is a front view of an electromagnetic steel plate forming member blanked in order to mold a rotor core in a second related art.
Figure 9:
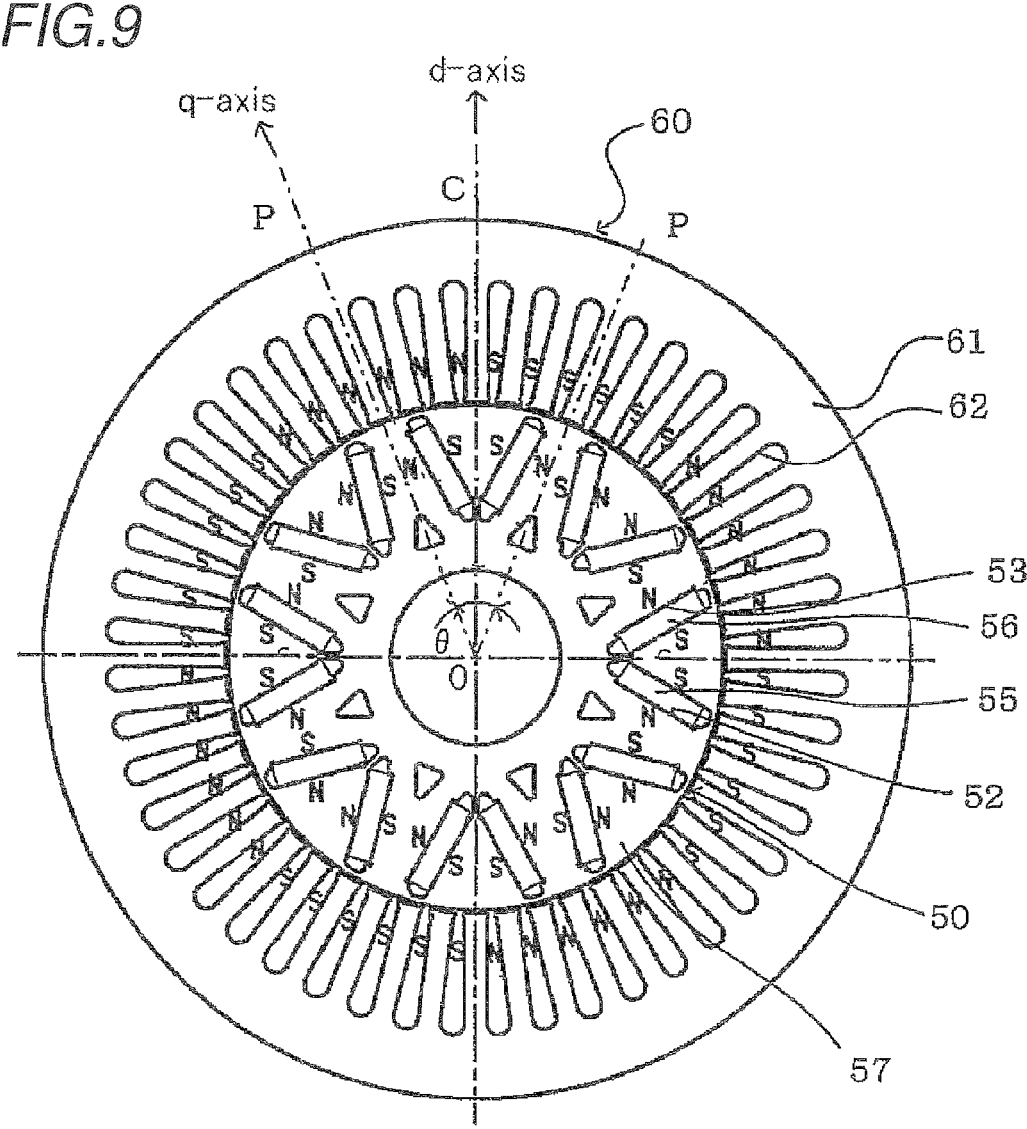
FIG. 9 is a front sectional view of a part of an IPM motor to which the rotor in the second related art is applied, which shows schematically a positional relation of poles between a stator and a rotor which generate optimum rotating torque.

FIGS. 5A and 5B are diagrams for explaining the operation of the IPM motor, which FIG. 5A is a schematic diagram showing the operation when the motor rotates reversely, and FIG. 5B is a diagram showing a relation between a current phase which generates a rotating magnetic field of the motor and a torque.

FIG. 4 shows an optimum rotating torque position in case that the rotating electric machine rotates clockwise (normally), while FIG. 5 shows an optimum rotating torque position in case that the rotating electric machine rotates counterclockwise (reversely).

In FIG. 5A, the left side of the same-pole repulsion-boundary point of the d-axis of the rotor is a repulsive portion in which both the stator winding side and the permanent magnet side are the S-poles. Further, the right side is an attractive portion in which the stator winding side is the N-pole and the permanent magnets side is the S-pole. Herein, magnetic torque, which is about to move the rotor from the attractive portion in which the flux density is dense to the repulsive portion in which the flux density is sparse, that is, in the counterclockwise direction acts on the rotor. FIG. 5B shows the relation in this case between the current phase of the permanent magnet type synchronous rotating electric machine and the torque. Since overall torque is basically the same as that in case of normal rotation of the rotating electric machine, it is omitted.

As shown in FIG. 3, of the two magnet holes 2, 3 for inserting therein the two permanent magnets 6, 7 per pole along the V-shape, which are provided in the region of the radial pole pitch lines OP provided in the rotor core 11 at the predetermined pole pitch angle θ, one magnet hole 2 is displaced in a direction apart from the center line OC of the pole pitch lines OP, and the other magnet hole 3 is displaced in a direction approaching to the center line OC of the pole pitch lines OP. Hereby, since the magnetic fluxes formed by the two permanent magnets 6,7 are distributed with displacement from the center line OC of the pole pitch lines OP in the rotor core 11 in the circumferential direction, both the magnet torque and the reluctance torque in the V-arrangement of the permanent magnets of which lengths in the radius direction are different improve with respect to the one-rotating direction, and efficiency of the permanent magnet type synchronous rotating electric machine may be increased, compared with the rotor in which the permanent magnets embedded in the rotor are arranged in isosceles V-shape as described in the second related art shown in FIG. 10. The improvement of the magnet torque with respect to the one-rotating direction may improve greatly efficiency of the permanent magnet type synchronous rotating electric machine in a low-speed at light load area where the current is low.

Further, generally, centrifugal force acts on the embedded permanent magnet by the rotation of the rotor 10, so that the permanent magnet is about to go to the outer circumferential side of the rotor. The larger the contact area between the permanent magnet and the permanent magnet insertion hole is, the closer to the rotation center the permanent magnet is located, and the lighter the weight of the permanent magnet is, the stronger the centrifugal force becomes. In the V-arrangement of the permanent magnets in which one of the two permanent magnets 6, 7 is short in length in the radius direction and the other is long in length as in the embodiment, the permanent magnet 7 which is shorter than the permanent magnet 6 in length in the radius direction is setting up with respect to the rotation center but light in weight correspondingly to the short length. The permanent magnet 6 which is longer than the permanent magnet 7 in length in the radius direction, since it is located closer to the horizontal with respect to the rotation center on construction than that in the isosceles V-shape, is strong in centrifugal force.

Further, as shown in FIG. 2, on the construction, the arcuate spaces 20 to 23 for preventing flux leakage are provided for the both end portions of each of the first and second magnet holes 2, 3 in the bulging shape toward the outer circumferential side or the inner circumferential side. Further, the first and second magnet holes 2, 3 are provided respectively with the arcuate spaces 24, for preventing flux leakage which bulge toward the outer circumferential side at a curvature larger than a curvature of the corner portion so as to include the corner portion of each magnet hole. Therefore, by these arcuate spaces, concentration of stress in the magnet holes in the rotor 10 may be diffused and mitigated.

Further, as shown in FIG. 2, under the constitution of the embodiment, since the magnet holes 2, 3 for inserting therein the two magnets per pole are provided in the rotor core 11 along the V-shape and the center bridge 5 is provided between the magnets holes 2,3, the centrifugal force-resistance increases more by this center bridge. Namely, high-speed rotation is realized.

Further, as shown in FIG. 2, since the eight cavity portions 8 are formed in the rotor core 11, the weight of the rotor 10 which is by nature a weight may be reduced correspondingly, so that mechanical loss in a bearing portion (not shown) which supports a rotor shaft (not shown) fitted into a hollow portion of the rotor 10 may be reduced, and efficiency may be increased. In this case, the cavity portion 8 is located and formed in the area set by shape and dimension determined by stress limit which generates by the centrifugal force acting on the rotor 10 and by shape and dimension determined by judging the location where the influence on a magnetic path is small. Therefore, the mechanical strength for the centrifugal force of rotation is not impaired, the flow of fluxes (magnetic path) by the stator winding (not shown) attached to the slot 14 of the stator 12 and by the permanent magnets 6, 7 of the rotor 10 is not obstructed, and a bad influence is not exerted upon characteristics.

Further, since coolant may be taken in the cavity portion 8 of the rotor core 11 and circulated, the rotor core may be directly cooled, so that cooling property of the rotor 10 may be improved.

Figure 10A:
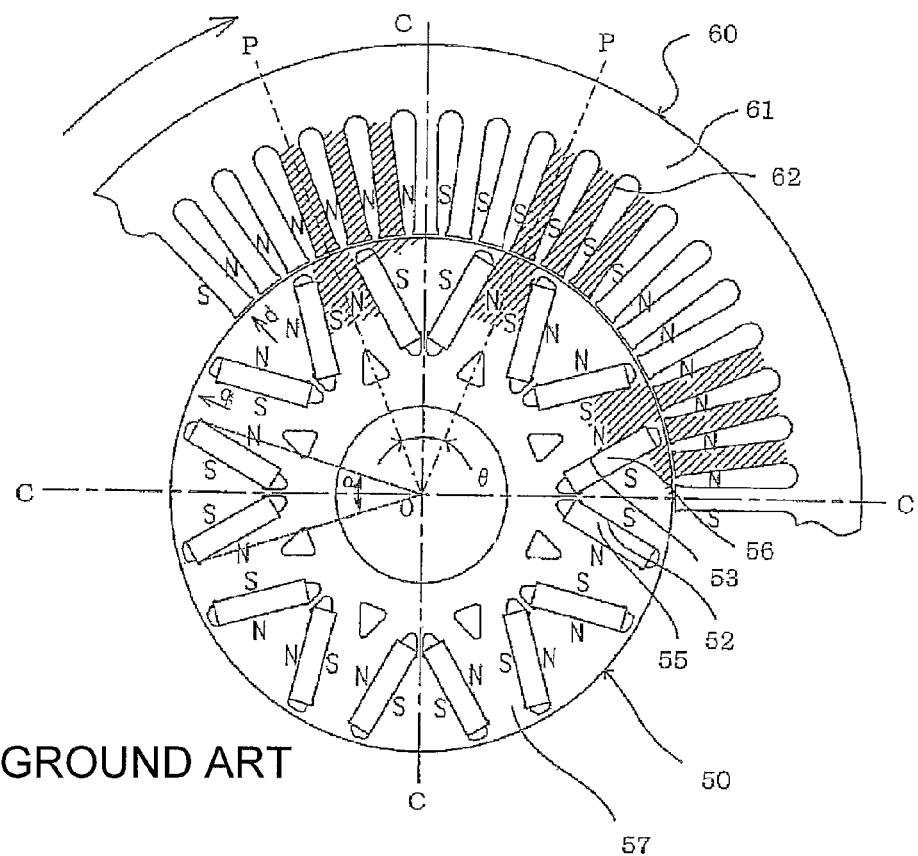
FIG. 10A is a diagram for explaining of the operation of the IPM motor in the second related art, which is a schematic diagram showing the operation when the motor rotates normally.
Figure 10B:
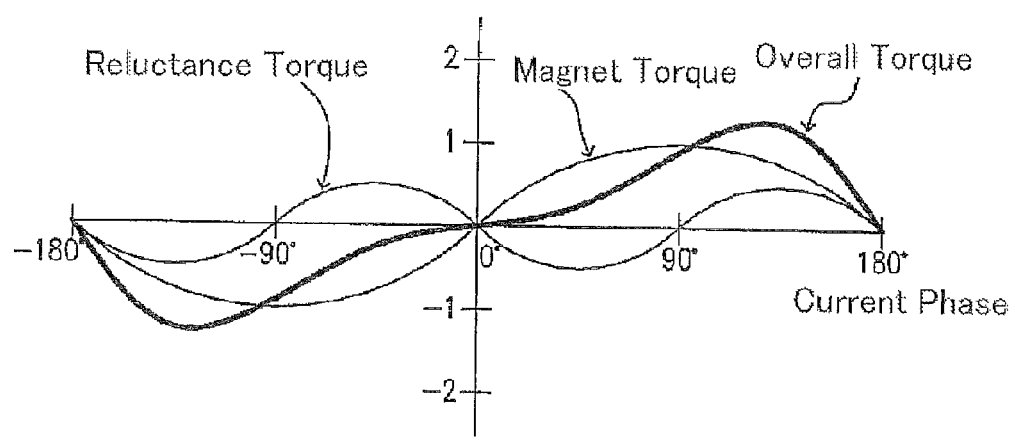
FIG. 10B is a diagram for explaining of the operation of the IPM motor in the second related art, which is a diagram showing a relation between a current phase which generates a rotating magnetic field of the motor and torque.

Thus, in the description of the principle in FIG. 3, the d-axis magnetic repulsion-boundary point provided for the rotor is displaced to the shorter permanent magnet side by one slot, while in the second related art shown in FIG. 10, the d-axis magnetic repulsion boundary point is necessarily located in the center of the usual isosceles V-shaped permanent magnet arrangement. The amount of this displacement is appropriately different according to combination of the slot number of the stator of the rotating electric machine and the pole number of the rotor.

Further, though the so-called slot stator has been described in the above description of the embodiment and the figures, since the embodiment of the invention relates to the structure of the rotor, the stator is not limited to the slot stator, a so-called slot-less stator may be used. Also in this case, the similar advantage may be obtained.

Further, the invention maybe applied also to a linear motor which linearly moves in place of the rotating motor.

According to the electromagnetic steel plate forming member, the electromagnetic steel plate laminator, the permanent magnet type synchronous rotating electric machine rotor provided this, and the permanent magnet type synchronous rotating electric machine of the embodiment, in the iron core portion formed between the upper end surfaces of the two magnet holes arranged in the V-shape in the rotor core and the outer circumferential portion of the rotor core, the saturation of the q-axis flux maybe suppressed, and both utilization of the reluctance torque and improvement of the magnet torque can be realized. In result, since large torque maybe obtained also in the starting time and in abrupt change of load, efficiency can be made good. Therefore, the embodiment of the invention is effective as a drive motor or a generator for a hybrid car, a fuel cell car, or an electric car, as a drive motor or a generator for a railway vehicle, and as a generator used in a generator car for an uninterruptible power supply. Further, the embodiment of the invention is effective also as a drive motor for an industrial machine such as an elevator, an elevator in a multi-level parking zone, a compressor or a blower for wind or water power, a fluid machine such as a pump, or a working machine including mainly a semiconductor manufacturing apparatus or a machine tool.

What is claimed is:

1. A permanent magnet synchronous rotating electric machine comprising:
   a rotor comprising:
      a first hole;
      a second hole provided on an opposite side with respect to a center line extending along a radial direction of the rotor;
      a first magnet provided in the first hole and extending along a first longitudinal axis inclined at a first acute angle with respect to the center line; and
      a second magnet provided in the second hole and extending along a second longitudinal axis inclined at a second acute angle with respect to the center line, the second acute angle being smaller than the first acute angle and being formed opposite to the first acute angle with respect to the center line, an outer circumferential distance between a first radially outer end of the first magnet and a second radially outer end of the second magnet being greater than an inner circumferential distance between a first radially inner end of the first magnet and a second radially inner end of the second magnet,
   wherein the rotor includes a first pole pitch line and a second pole pitch line each extending along the radial direction forming a single magnetic pole formed by the first and second magnets, the center line being provided between the first and second pole pitch lines,
   wherein the center line bisects an angle between the first and second pole pitch lines into equal angular amounts, and
   wherein the first magnet is provided entirely between the first pole pitch line and the center line and the second magnet is provided entirely between the second pole pitch line and the center line; and
   a stator including a stator core and a stator winding provided to the stator core, the stator having a displacement point of first and second magnetic poles to be generated by a current passing through the stator winding, the displacement point being provided on an inner peripheral surface facing an outer peripheral surface of the rotor via a gap, the single magnetic pole formed by the first and second magnets being different from the first magnetic pole of the stator on the inner peripheral surface on a first side of the center line when the displacement point is provided substantially on the center line of the rotor, the single magnetic pole formed by the first and second magnets being the same as the second magnetic pole of the stator on the inner peripheral surface on a second side of the center line when the displacement point is provided substantially on the center line of the rotor, the second side being provided on an opposite side of the first side with respect to the center line in the circumferential direction.

2. The permanent magnet synchronous rotating electric machine according to claim 1,
   wherein no magnets are provided between the first and second pole pitch lines in the circumferential direction other than the first and second magnets.

3. The permanent magnet synchronous rotating electric machine according to claim 1,
   wherein the first magnet is provided in front of the second magnet in a normal rotating direction of the rotor.

4. The permanent magnet synchronous rotating electric machine according to claim 1, wherein the rotor further comprises a center bridge provided on the center line and between the first and second radially inner ends of the first and second magnets, and wherein the center line passes through a circumferential center between the first and second radially inner ends of the first and second magnets in the circumferential direction.

5. The permanent magnet synchronous rotating electric machine according to claim 1, wherein a length of the first magnet along the first longitudinal axis is longer than a length of the second magnet along the second longitudinal axis.

6. The permanent magnet synchronous rotating electric machine according to claim 1, wherein the first and second magnets are provided to form a substantially v-shape.

7. The permanent magnet synchronous rotating electric machine according to claim 1, wherein no magnets are provided between the first magnet and the second pole pitch line in the circumferential direction other than the second magnet, and wherein no magnets are provided between the second magnet and the first pole pitch line in an opposite circumferential direction other than the first magnet.

8. The permanent magnet synchronous rotating electric machine according to claim 1, wherein a minimum distance between the first magnet and the first pole pitch line is different than a minimum distance between the second magnet and the second pole pitch line.

9. A permanent magnet synchronous rotating electric machine comprising:

a rotor comprising:

a first hole;

a second hole provided on an opposite side with respect to a center line extending along a radial direction of the rotor;

a first magnet provided in the first hole and extending along a first longitudinal axis inclined at a first acute angle with respect to the center line extending along a radial direction of the rotor; and a second magnet provided in the second hole and extending along a second longitudinal axis inclined at a second acute angle with respect to the center line, the second acute angle being smaller than the first acute angle and being formed opposite to the first acute angle with respect to the center line, an outer circumferential distance between a first radially outer end of the first magnet and a second radially outer end of the second magnet being greater than an inner circumferential distance between a first radially inner end of the first magnet and a second radially inner end of the second magnet, wherein the rotor includes a first pole pitch line and a second pole pitch line each extending along the radial direction forming a single magnetic pole, the center line being provided between the first and second pole pitch lines, wherein the center line bisects an angle between the first and second pole pitch lines into equal angular amounts, and wherein the first magnet is provided entirely between the first pole pitch line and the center line and the second magnet is provided entirely between the second pole pitch line and the center line; and a stator including a stator core and a stator winding, the stator core having a plurality of teeth, the stator winding being provided to the teeth, the stator having a displacement point of first and second magnetic poles to be generated by a current passing through the stator winding of the stator, the displacement point being provided on an inner peripheral surface facing an outer peripheral surface of the rotor via a gap, a d-axis being defined as a magnetic axis of the rotor, a q-axis being defined as a salient pole of the rotor, substantially two of the teeth of the stator core being opposed to the salient pole in which magnetic flux along the q-axis flows when the displacement point is provided substantially on the center line of the rotor.

10. The permanent magnet synchronous rotating electric machine according to claim 9, wherein no magnets are provided between the first and second pole pitch lines in the circumferential direction other than the first and second magnets.

11. The permanent magnet synchronous rotating electric machine according to claim 9, wherein the first magnet is provided in front of the second magnet in a normal rotating direction of the rotor.

12. The permanent magnet synchronous rotating electric machine according to claim 9, wherein the rotor further comprises a center bridge provided on the center line and between the first and second radially inner ends of the first and second magnets, and wherein the center line passes through a circumferential center between the first and second radially inner ends of the first and second magnets in the circumferential direction.

13. The permanent magnet synchronous rotating electric machine according to claim 9, wherein a length of the first magnet along the first longitudinal axis is longer than a length of the second magnet along the second longitudinal axis.

14. The permanent magnet synchronous rotating electric machine according to claim 9, wherein the first and second magnets are provided to form a substantially v-shape.

15. The permanent magnet synchronous rotating electric machine according to claim 9, wherein no magnets are provided between the first magnet and the second pole pitch line in the circumferential direction other than the second magnet, and wherein no magnets are provided between the second magnet and the first pole pitch line in an opposite circumferential direction other than the first magnet.

16. The permanent magnet synchronous rotating electric machine according to claim 9, wherein a minimum distance between the first magnet and the first pole pitch line is different than a minimum distance between the second magnet and the second pole pitch line.

17. A rotor core comprising:

an electromagnetic steel plate layered body comprising:

a first hole; and a second hole provided on an opposite side with respect to a center line extending along a radial direction of the rotor core;

a first magnet provided in the first hole and extending along a first longitudinal axis inclined at a first acute angle with respect to the center line; and a second magnet provided in the second hole and extending along a second longitudinal axis inclined at a second acute angle with respect to the center line, the second acute angle being formed opposite to the first acute angle with respect to the center line, an outer circumferential distance between a first radially outer end of the first magnet and a second radially outer end of the second magnet being greater than an inner circumferential distance between a first radially inner end of the first magnet and a second radially inner end of the second magnet, the second acute angle being smaller than the first acute angle so that saturation of flux along q-axis is suppressed and reluctance torque is produced, wherein the rotor core includes a first pole pitch line and a second pole pitch line each extending along the radial direction forming a single magnetic pole, the center line being provided between the first and second pole pitch lines, wherein the center line bisects an angle between the first and second pole pitch lines into equal angular amounts, wherein the first magnet is provided entirely between the first pole pitch line and the center line and the second magnet is provided entirely between the second pole pitch line and the center line, and wherein no magnets are provided between the first and second pole pitch lines in the circumferential direction other than first and second magnets.

18. The rotor core according to claim 17, wherein the first magnet is provided in front of the second magnet in a normal rotating direction of the rotor core.

19. The rotor core according to claim 17, wherein the rotor core includes a center bridge provided on the center line and between the radially inner ends of the first and second magnets.

20. The rotor core according to claim 17, wherein a length of the first magnet along the first longitudinal axis is longer than a length of the second magnet along the second longitudinal axis.

21. The rotor core according to claim 17, wherein the first and second magnets are provided to form a substantially v-shape.

22. The rotor core according to claim 17, further comprising:

wherein no magnets are provided between the first magnet and the second pole pitch line in the circumferential direction other than the second magnet, and wherein no magnets are provided between the second magnet and the first pole pitch line in an opposite circumferential direction other than the first magnet.

23. The rotor core according to claim 17, wherein a minimum distance between the first magnet and the first pole pitch line is different than a minimum distance between the second magnet and the second pole pitch line.

24. A permanent magnet synchronous rotating electric machine comprising:

a rotor comprising:
   a first hole;
   a second hole provided on an opposite side with respect to a center line extending along a radial direction of the rotor;
   a first magnet provided in the first hole and extending along a first longitudinal axis inclined at a first acute angle with respect to the center line; and
   a second magnet provided in the second hole and extending along a second longitudinal axis inclined at a second acute angle with respect to the center line, the second acute angle being smaller than the first acute angle and being formed opposite to the first acute angle with respect to the center line, an outer circumferential distance between a first radially outer end of the first magnet and a second radially outer end of the second magnet being greater than an inner circumferential distance between a first radially inner end of the first magnet and a second radially inner end of the second magnet,
   wherein the rotor includes a first pole pitch line and a second pole pitch line each extending along the radial direction forming a magnetic pole of the rotor formed by the first and the second magnets, the center line being provided between the first and second pole pitch lines,
   wherein the center line bisects an angle between the first and second pole pitch lines into equal angular amounts, and
   wherein the first magnet is provided entirely between the first pole pitch line and the center line and the second magnet is provided entirely between the second pole pitch line and the center line; and a stator including a stator core and a stator winding provided to the stator core, the stator having a displacement point of first and second magnetic poles to be generated by a current passing through the stator winding, the displacement point being provided on an inner peripheral surface facing an outer peripheral surface of the rotor via a gap, a magnetic pole of the rotor on the outer peripheral surface being different from the first magnetic pole of the stator on the inner peripheral surface on a first side of the center line when the displacement point is provided substantially on the center line of the rotor, the magnetic pole of the rotor on the outer peripheral surface being the same as the second magnetic pole of the stator on the inner peripheral surface on a second side of the center line when the displacement point is provided substantially on the center line of the rotor.

25. The permanent magnet synchronous rotating electric machine according to claim 24, wherein a minimum distance between the first magnet and the first pole pitch line is different than a minimum distance between the second magnet and the second pole pitch line.

* * * * *